United States Patent [19]

Ohira

[11] Patent Number: 5,105,404

[45] Date of Patent: Apr. 14, 1992

[54] OPTICAL RECORDING METHOD AND APPARATUS USED TO FORM A GROOVE ON A RECORDING MEDIUM

[75] Inventor: Hiroyuki Ohira, Yamanashi, Japan

[73] Assignees: Pioneer Electronic Corporation, Tokyo; Pioneer Video Corporation, Yamanashi, both of Japan

[21] Appl. No.: 656,526

[22] Filed: Feb. 19, 1991

[30] Foreign Application Priority Data

Jun. 15, 1990 [JP] Japan .................................. 2-155124

[51] Int. Cl.$^5$ ................................................ G11B 7/00
[52] U.S. Cl. .................................... 369/44.13; 369/109
[58] Field of Search ................. 369/44.13, 109, 124, 369/111, 116, 119, 275.2, 275.3, 121, 100, 110, 112; 250/201.5

[56] References Cited

U.S. PATENT DOCUMENTS

| | | | |
|---|---|---|---|
| 4,364,118 | 12/1982 | Maeda et al. | 369/44.13 |
| 4,703,408 | 10/1987 | Yonezawa et al. | 369/44.13 |
| 4,716,560 | 12/1987 | Itonaga | 369/275.2 |
| 4,791,627 | 12/1988 | Yonezawa | 369/109 |
| 4,982,398 | 1/1991 | Yamamoto et al. | 369/44.13 |

*Primary Examiner*—Roy N. Envall, Jr.
*Assistant Examiner*—Thang V. Tran
*Attorney, Agent, or Firm*—Sughrue, Mion, Zinn Macpeak & Seas

[57] ABSTRACT

An optical recording method comprising steps of forming a groove on a surface of a recording medium, such as a recording disk, by projecting a write beam, such as a laser beam, onto the surface of the recording medium, and wobbling the write beam in a direction perpendicular to the groove to be formed, whereby the write beam is wobbled on the surface of the recording medium with a period of deviation not greater than one half of the diameter of the spot of the write beam. The groove formed by the present invention has a width greater than the diameter of the write beam and sharp edges for providing satisfactory characteristics in recording and reproducing.

5 Claims, 9 Drawing Sheets

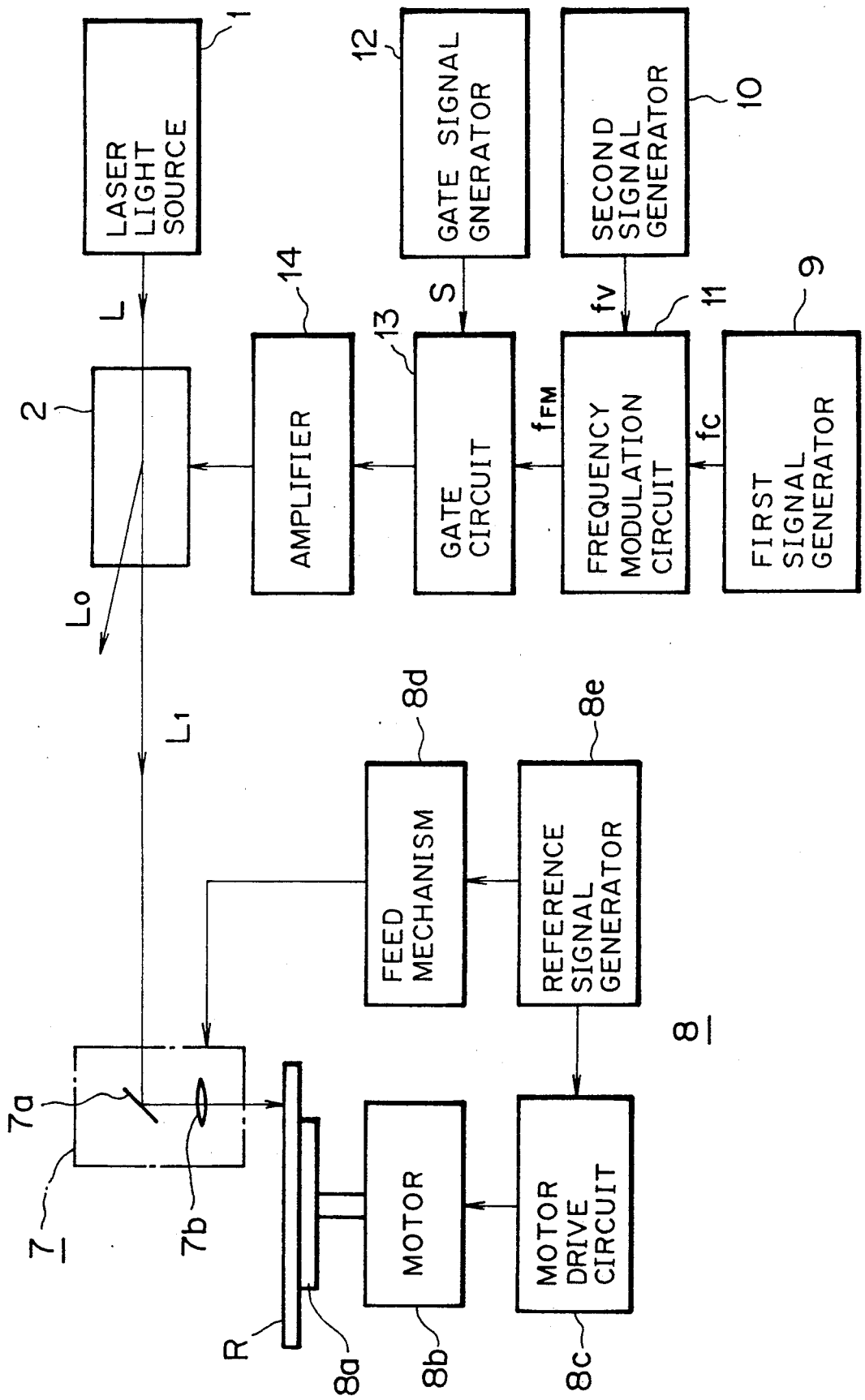

OPTICAL RECORDING METHOD AND APPARATUS USED TO FORM A GROOVE ON A RECORDING MEDIUM

BACKGROUND OF THE INVENTION

1. Field of the Invention

This invention relates to an optical recording method for forming a groove on a writable or rewritable optical information recording medium.

2. Description of the Prior Art

Referring to a block diagram of FIG. 1 showing a conventional optical recording apparatus, a laser light source 1 emits an Argon laser beam of a Krypton laser beam, and an optical light beam deflector 2 provides a zeroth order light beam $L_o$ and an nth order diffracted light beam $L_n$ (n=1, 2, ...) having an angle of diffraction that corresponds to an output of an amplifier 14.

The optical light beam deflector 2 is a so-called A/O deflector utilizing the acousto-optic effect. Ordinarily, an nth order diffracted light beam $L_n$ to be selected for writing is a first order diffracted light beam $L_1$. A recording optical system 7 includes a mirror 7a for reflecting the first order diffracted light beam $L_1$ derived from the optical light beam deflector 2, and an objective lens 7b for converging the first order diffracted light beam $L_1$ reflected by the mirror 7a onto a recording surface of a recording disk R as a write beam spot. A driving unit 8 includes a turntable 8a mounted with the recording disk R, a motor 8b for rotating the turntable 8a, a motor driving circuit 8c for driving the motor 8b, a feed mechanism 8d for feeding the recording optical system 7 in a direction radial to the axis of the recording disk R, and a reference signal generator 8e for supplying reference signals to the motor driving circuit 8c and the feed mechanism 8d. A first signal generator 9 generates a carrier wave $f_c$ for determining an angle of diffraction of an nth order diffracted light beam $L_n$ coming from the optical light beam deflector 2. A gate signal generator 12 generates a gate signal S for controlling a gate circuit 13. The gate circuit 13 passes the carrier wave $f_c$ fed by the first signal generator 9 to an amplifier 14 while the gate signal generator 12 generates the gate signal S of ON. The amplifier 14 amplifies the carrier wave $f_c$ fed by the first signal generator 9 and applies the amplified carrier wave $f_c$ to the optical light beam deflector 2.

FIGS. 2A, 2B and 2C are digrams for illustrating the function of the optical recording apparatus of FIG. 1 to form a guide groove on a surface of the recording disk. As shown in FIG. 2C, the recording disk R consists of a substrate B and a photoresist film C of a thickness on the order of 1000 Å formed over the major surface of the substrate B. The photoresist film C is exposed to a light beam having a spot $L_s$ of a diameter $d_{11}$ to form the groove G thereon.

In operation, the laser light source 1 emits a light beam L, the first signal generator 9 supplies a carrier wave $f_c$ to the amplifier 14. The amplifier 14 applies the carrier wave $f_c$ to the optical light beam deflector 2 after amplification. Then, the optical light beam deflector 2 derives a zeroth order light beam $L_0$ and an nth order diffracted light beam $L_n$ therefrom. Further, the first order diffracted light beam $L_1$ coming from the optical light beam deflector 2 is reflected by the mirror 7a in the recording optical system 7 and is projected onto the photoresist film C of the recording disk R through the objective lens 7b. While the first order diffracted light beam $L_1$ is being projected onto the photoresist film C, it is possible to rotate the turntable 8a mounted with the recording disk R and then to transfer the recording optical system 7 in a direction radial to the axis of the recording disk R synchronously with the rotation thereof by supplying the reference signal generated by the reference signal generator 8e in the driving unit 8 to the motor driving circuit 8c and the feed mechanism 8d.

FIG. 2A shows the Gaussian distribution of intensity of the first order diffracted light beam $L_1$ passed through the objective lens 7b in projecting the first order diffracted light beam $L_1$ onto the photoresist film C. Accordingly, the diameter $d_{11}$ of the light spot $L_s$ (FIG. 2B) converged on the photoresist film C is equal to the diameter of a portion of the light spot $L_s$ where is $1/e^2$ times the peak value of the Gaussian distribution of intensity of the light beam shown in FIG. 2A. When it is assumed that the light beam L is an Argon laser beam of 458 nm in wavelength, the numerical aperture NA of the objective lens 7b is 0.9, a width of a groove G to be formed by the light spot $L_s$ may be varied within a range of approximately 0.3 μm to 0.8 μm by adjusting the diameter of the light beam L emitted by the laser light source 1 through the change of light beam power.

However, in the optical recording apparatus of FIG. 1, since it is unable to form a groove G of width at or greater than 0.8 μm when the numerical aperture NA of the objective lens 7a is 0.9, there have been proposed several methods to form a wide groove G having a width greater than 0.8 μm. One of the methods implemented by the optical recording apparatus shown in FIG. 1 will be described with reference to FIGS. 3A, 3B and 3C. To carry out the method for forming a wide groove G, the effective numerical aperture NA' of the objective lens 7b of the recording optical system 7 is reduced more or less, and thereby the diameter $d_{12}$ of the light spot $L_s$ (FIG. 3B) converged on the photoresist film C will be the same diameter of a portion which is $1/e^2$ times the peak value of the Gaussian distribution of intensity of the light beam as shown in FIG. 3A, thus resulting in a wide groove. That is, when the light beam L is an Argon laser beam of 458 nm in wavelength and the effective numerical aperture NA' of the objective lens 7b is reduced to 0.45, the groove G having a width of approximately 0.5 μm to 1.5 μm can be formed in the photoresist film C by the light spot $L_s$ by adjusting the diameter of the light beam L emitted by the laser light source 1 through the change of the beam power.

Another conventional optical recording apparatus will be described hereinafter with reference to FIG. 4, wherein like numerals denote like elements in FIG. 1 and the description thereof will be omitted.

Referring to FIG. 4, a first beam splitter 3, such as of a half mirror, splits a first order diffracted light beam $L_1$ coming from the optical light beam deflector 2. A first mirror 4 reflects the first order diffracted light beam $L_1$ passed through the first beam splitter 3 towards a second beam splitter 6, such as of a half mirror. A second mirror 5 reflects the first order diffracted light beam $L_1$ reflected by the first beam splitter 3 towards the second beam splitter 6. The second beam splitter 6 reflects the first order diffracted light beam $L_1$ coming from the first mirror 4, and transmits the first order diffracted light beam $L_1$ coming from the second mirror 5. The first beam splitter 3, the second beam splitter 6, the first mirror 4 and the second mirror 5 are arranged so that the center distance between the first order diffracted light beam $L_1$ transmitted through the second beam splitter 6 and the first order light beam $L_1$ reflected by the second beam splitter 6 corresponds to the width of a groove G to be formed.

The groove forming steps of the optical recording apparatus shown in FIG. 4 will be described with reference to FIGS. 5A, 5B and 5C. In this case, an elliptic spot $L_s$ is formed on the photoresist film C. A groove G is formed in a direction along the minor axis of the elliptic spot $L_s$. As stated above, the first order diffracted light beam $L_1$ coming from the optical light beam deflector 2 and passed through two light paths, one of which is formed by the first beam splitter 3, the first mirror 4 and the second beam splitter 6, and the other of which is formed by the first beam splitter 3, the second mirror 5 and the second beam splitter 6, to the recording optical system 7 has the Gaussian distribution of intensity as shown in FIG. 5A. Accordingly, the spot diameter $d_{13}$ of the light spot $L_s$ (FIG. 5B) concentrated on the photoresist film C is $1/e^2$ times the peak value of the Gaussian distribution of intensity shown in FIG. 5A. Therefore, when the light beam is the Argon laser beam of 458 nm in wavelength and the numerical aperture NA of the objective lens 7b is 0.9, a groove G having a width in the range of approximately 0.3 $\mu$m to 1.5 $\mu$m can be formed by adjusting the diameter fo the light beam emitted by the laser light source 1 and the center distance between the first order diffracted light beams $L_1$ passed through different light paths through the change of beam power.

A groove G having an increased width can be formed by the conventional optical recording apparatuses as described above. However, when a groove G is formed in the manner as illustrated in FIGS. 3A, 3B and 3C, since the gradient at a portion of the Gaussian distribution of intensity which determines the spot diameter $d_{12}$ is dull as shown in FIG. 3B, the groove G may have rounded edges as shown in FIG. 3C, which in turn deteriorates the recording and reproducing characteristics of the groove G.

Further, when the groove G is formed in the manner as illustrated in FIGS. 5A, 5B and 5C, since the gradient at a portion of the Gaussian distribution of intensity which determines the spot diameter $d_{13}$ is steep, the groove may have sharp edges as shown in FIG. 5C, which improves the recording and reproducing characteristics fo the groove G. However, it is difficult to align the optical system of the first beam splitter 3, the second beam splitter 6, the first mirror 4 and the second mirror 5 with the groove having the required width.

It is therefore an object of this invention to eliminate the problems encountered in the optical recording apparatus of prior art and to provide an optical recording method capable of forming a relatively wide groove having satisfactory characteristics in recording and reproducing.

SUMMARY OF THE INVENTION

In accordance with one aspect of the present invention, there is provided an optical recording method for forming a groove of uniform width which is greater than a diameter of a write beam spot by wobbling the write beam spot with a period of deviation which is less than one half of the diameter of the write beam spot.

Since the angle of deflection of a single nth order diffracted light beam is controlled electrically to wobble the write beam spot with a period of deviation not greater than one half of the diameter of the write beam spot, a comparatively wide groove having satisfactory characteristics in recording and reproducing can be formed easily with high degree of accuracy.

BRIEF DESCRIPTION OF THE DRAWINGS

FIG. 6 is a block diagram showing an optical recording apparatus for implementing an optical recording method embodying the present invention;

DESCRIPTION OF THE PREFERRED EMBODIMENTS

Figure 1:
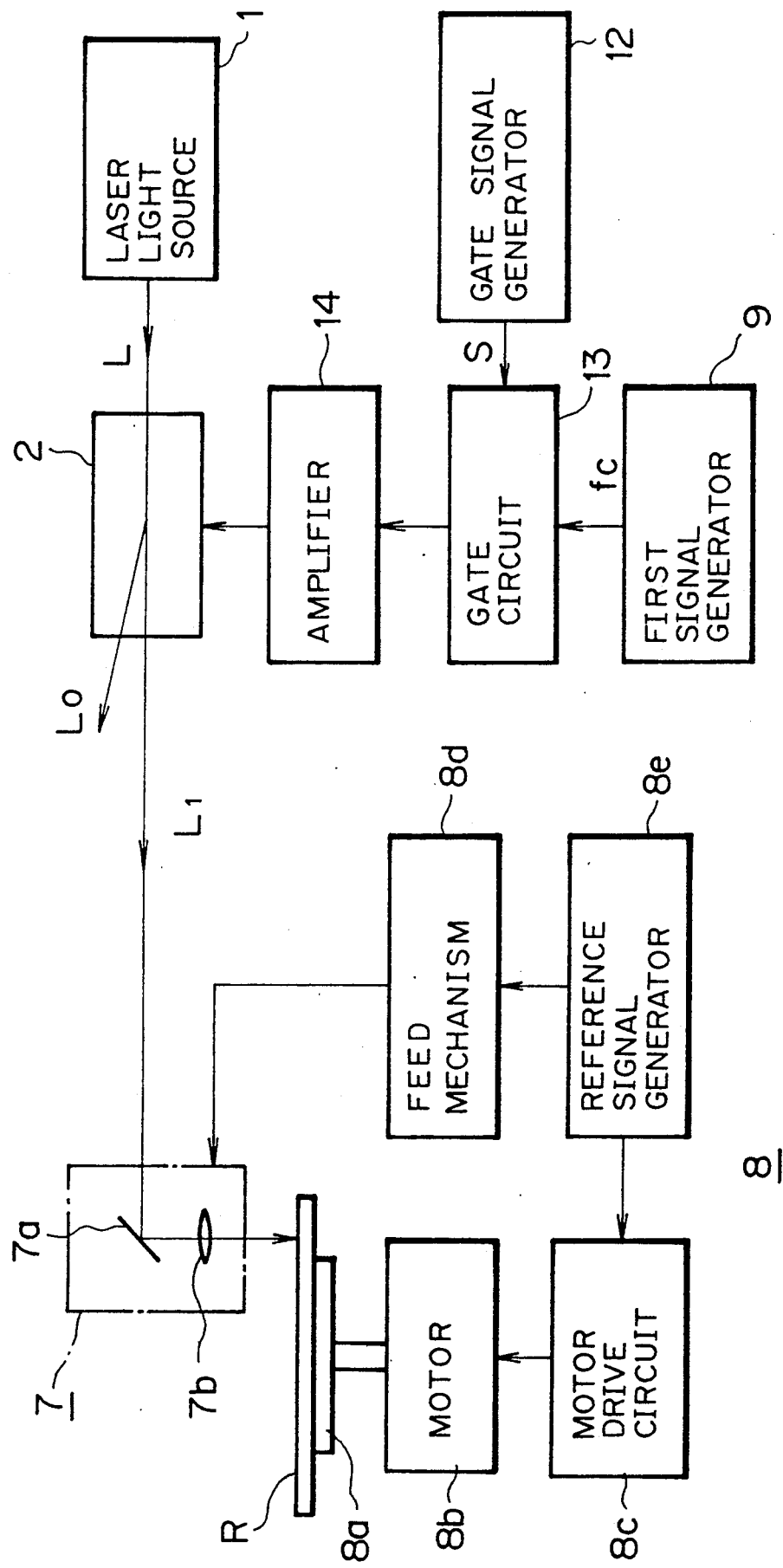
FIG. 1 is a block diagram showing an optical recording apparatus of prior art.
Figure 2A:
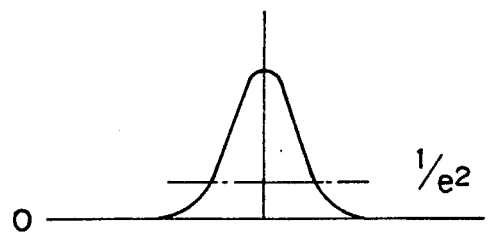
FIGS. 2A, 2B and 2C are diagrams showing steps of forming a groove by the optical recording apparatus of FIG. 1.
Figure 2B:
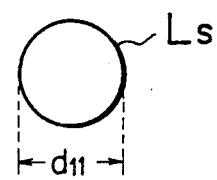
Figure 2C:
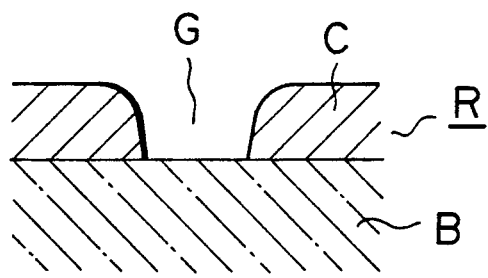
Figure 3A:
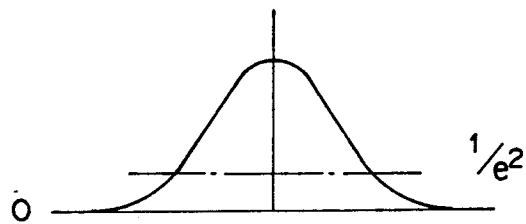
FIGS. 3A, 3B and 3C are diagrams showing different steps of forming a groove by the optical recording apparatus of FIG. 1.
Figure 3B:
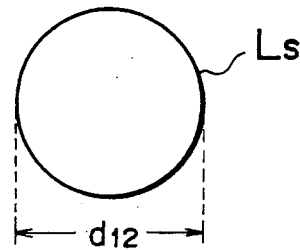
Figure 3C:
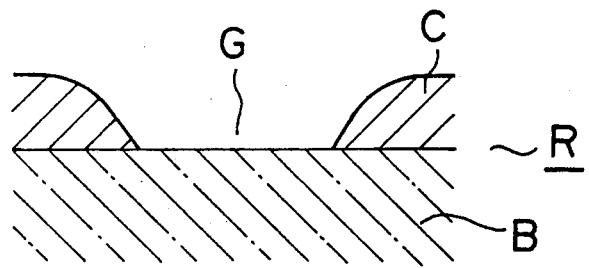
Figure 4:
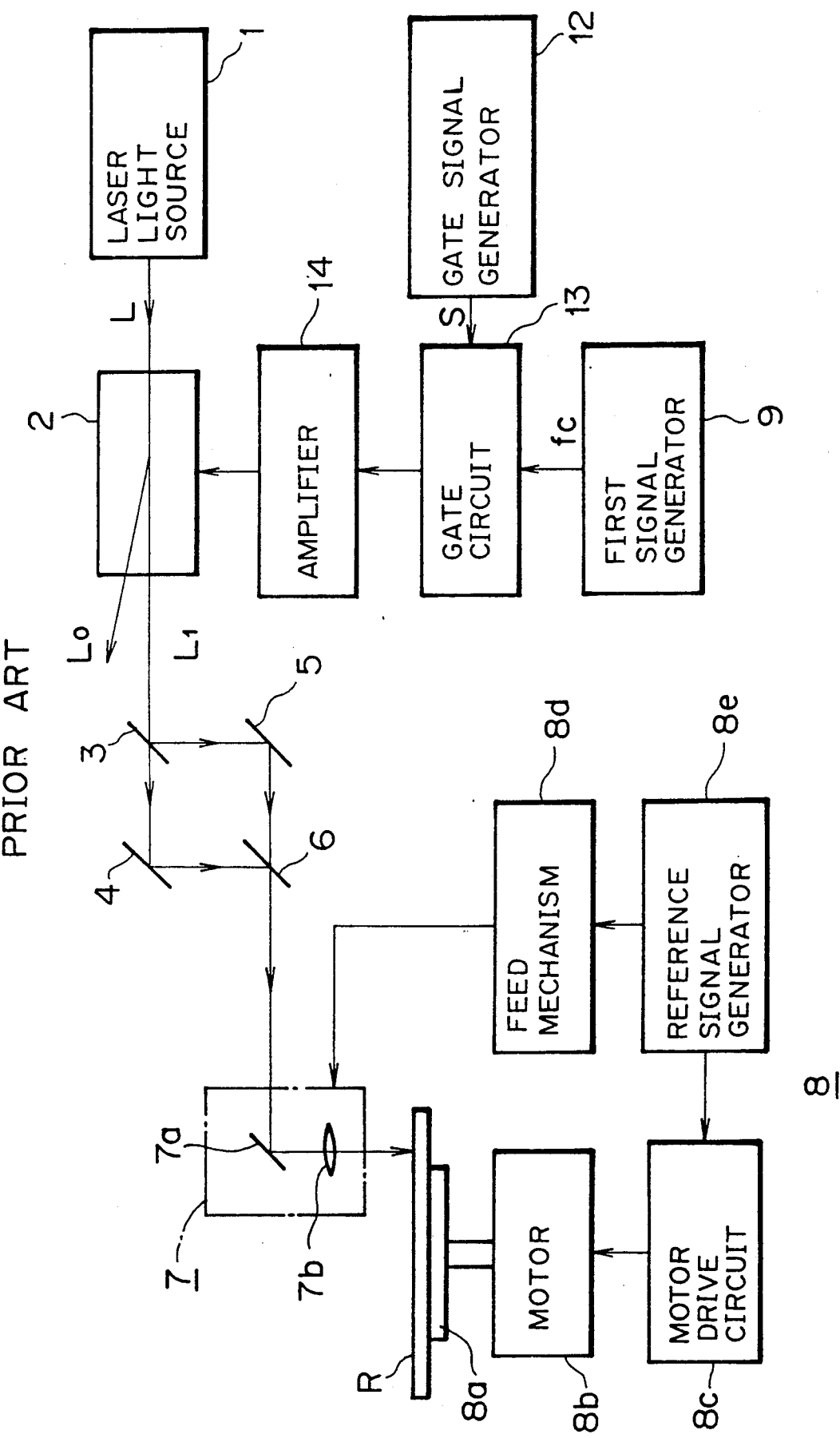
FIG. 4 is a block diagram showing another optical recording apparatus of prior art.
Figure 5A:
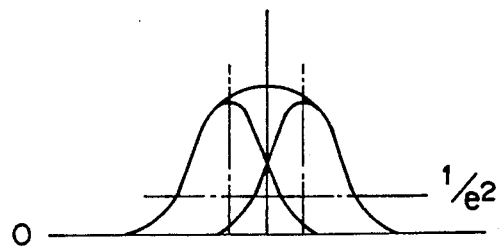
FIGS. 5A, 5B and 5C are diagrams showing steps of forming a groove by the optical recording apparatus of FIG. 4.
Figure 5B:
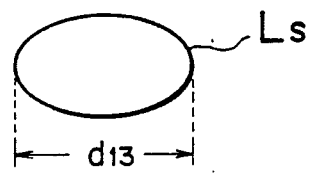
Figure 5C:
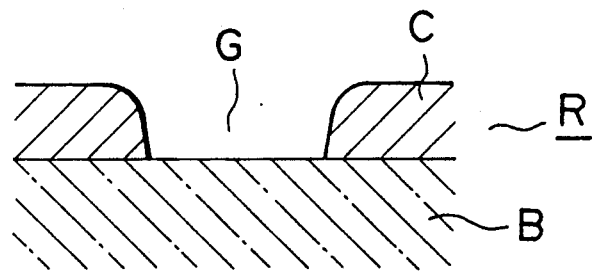

An optical recording apparatus for implementing an optical recording method in accordance with a preferred embodiment of this invention will be described with reference to FIG. 6, wherein like numerals denote like elements described in FIG. 1 and the description thereof will be omitted.

Now referring to FIG. 6, a second signal generator 10 generates a wobble signal $f_v$ for wobbling an nth order diffracted light beam $L_n$ provided by an optical light beam deflector 2 with a required amplitude. Accordingly, the light spot of the first order diffracted light beam $L_1$ is wobbled with the required amplitude on a photoresist film C or a recording surface of a recording disk R.

Figure 7A:
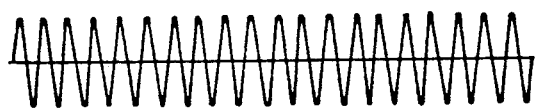
FIGS. 7A through 7E are waveform diagrams showing signals to be used in the optical recording apparatus of FIG. 6 for embodying the present invention.
Figure 7B:
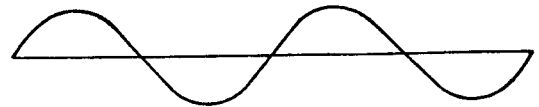
Figure 7C:
Figure 7D:
Figure 7E:
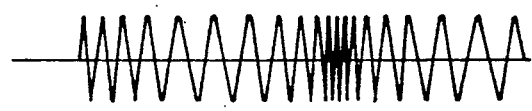

In operation, a frequency modulator 11 modulates a carrier wave $f_c$ generated by a first signal generator 9 with the wobble signal $f_v$ generated by the second signal generator 10 for providing a frequency modulated signal. By deriving the carrier wave $f_c$ as shown in FIG. 7A from the first signal generator 9 while emitting a light beam L from the laser light source 1 and the deriving the wobble signal as shown in FIG. 7B from the second signal generator 10, the frequency modulator 11 provides a frequency modulated signal $f_{FM}$ as shown in FIG. 7C. In addition to this, the gate signal generator 12 applies a generated gate signal S as shown in FIG. 7D to the gate circuit 13 for passing the frequency modulated signal $f_{FM}$ as shown in FIG. 7E through the gate circuit 13, and then the amplifier 14 applies the frequency modulated signal $f_{FM}$ to the optical light beam deflector 2 after amplification. The optical light beam deflector 2 provides the zeroth order diffracted light beam $L_0$ and an nth order diffracted light beam $L_n$ having an angle of diffraction being dependent on the carrier wave $f_c$ and then wobbles the nth order diffracted light beam $L_n$ with an amplitude according to the wobble signal $f_v$.

The recording optical system 7 projects the first order diffracted light beam $L_1$ coming from the optical light beam deflector 2 onto the photoresist film C of the recording disk R.

When the first order diffracted light beam $L_1$ is projected on the photoresist film C of the recording disk R, the turntable $8a$ mounted with the recording disk R is rotated and the recording optical system 7 is fed in a direction radial to the axis of the recording disk R in synchronism with the rotation of the turntable $8a$ by supplying a reference signal from the reference signal generator $8e$ in the driving unit 8 to the motor driving circuit $8c$ and the feed mechanism $8d$.

Figure 8A:
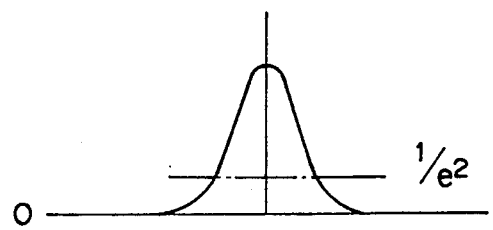
FIGS. 8A and 8B are diagrams showing steps of forming a groove by the optical recording apparatus of FIG. 6.
Figure 8B:
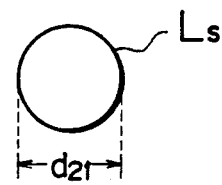
Figure 9A:
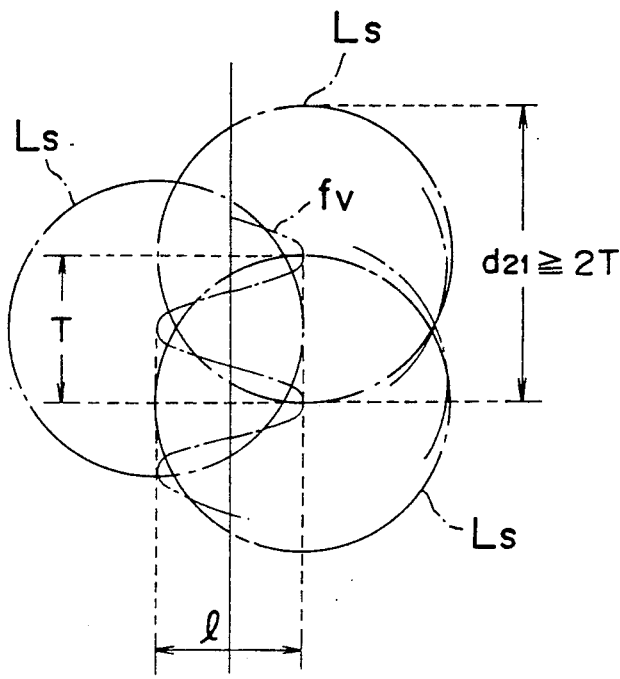
FIGS. 9A and 9B are diagrams showing steps of forming a groove by the optical recording apparatus of FIG. 6.
Figure 9B:
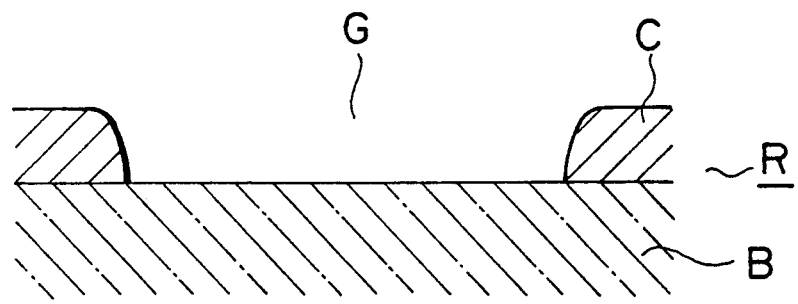

FIG. 8A shows the Gaussian distribution of intensity of the first order diffracted light beam $L_1$ projected through the objective lens $7b$ onto the recording disk R to form a groove G. The diameter $d_{21}$ of the light spot $L_s$ of the first order diffracted light beam $L_{1v}$ on the photoresist film C has a size of a portion which is $1/e^2$ times the peak value of the Gaussian distribution of intensity of the light beam as shown in FIGS. 8A and 8B. However, the light spot $L_s$ converged on the photoresist film C is wobbled as shown in FIG. 9A by the wobble signal $f_v$ with a period T of deviation not greater than one half of the diameter $d_{21}$ of the light spot $L_s$ namely, $2T \leq d_{21}$. Therefore, a comparatively wide groove G is formed on the recording disk R as shown in FIG. 9B. More specifically, the photoresist film C exposed to the wobbling light spot $L_s$ is developed for providing a master disk. A stamper is then prepared by making use of this master disk through electroforming and, in turn, a synthetic resin disk substrate provided with the wide groove G is fabricated by utilizing the obtained stamper. Following this stamping, the synthetic resin disk is coated by a recording layer such as of a dyestuff and the like (not shown) for providing a writable or rewritable optical disk.

As it has been described above, in case of forming a groove on the recording disk R at the maximum radial recording position, for example, at a radial position of 60 mm from the center of the recording disk R when the laser beam 1 is the Argon laser capable of emitting a laser beam of 458 nm in wavelength, the objective lens $7b$ has a numerical aperture NA of 0.9, it is possible to form a groove having a width or 1.0 $\mu$m by selecting a condition such that the diameter $d_{21}$ of the light spot is 0.4 $\mu$m, the frequency of the carrier wave $f_c$ is 200 MHz, the frequency of the wobble signal $f_v$ is 40 MHz, the period T of deviation of the light spot $L_s$ is not greater than one half of the diameter $d_{21}$ of the light spot, and an amount l of the deviation of the light spot is made 0.6 $\mu$m by adjusting the frequency deviation of the frequency modulated signal $f_{FM}$.

Accordingly, if the diameter $d_{21}$ of the light spot is varied within the range of 0.3 $\mu$m to 0.8 $\mu$m by changing the output power of the laser light source 1, and the deviation l of the light spot is varied within the range of 0 $\mu$m to 0.6 $\mu$m by adjusting the frequency deviation of the frequency modulated signal $f_{FM}$, there will be formed a groove G having the minimum width of 0.3 $\mu$m ($d_{21}=0.3$ $\mu$m, $l=0$) to the maximum width of 1.4 $\mu$m ($d_{21}=0.8$ $\mu$m, $l=0.6$ $\mu$m).

In case of forming the groove having the width of 0.3 $\mu$m to 1.4 $\mu$m, since the required diameter $d_{21}$ of the light spot $L_s$ is 0.3 $\mu$m to 0.8 $\mu$m, the groove G will have sharp edges and then there is provied satisfactory characteristics in recording and reproducing.

Thus, the optical recording method in accordance with this invention is able to form a wide groove G having satisfactory characteristics in recording and reproducing with making use of a single nth order diffracted light beam $L_n$ (light spot $L_s$) without causing any weaving.

Furthermore, a wide groove G can be formed comparatively in a simple manner with high degree of accuracy by wobbling the light spot $L_s$ wiht the period T of deviation which is not greater than one half of the diameter of the light spot $L_s$ through the electrical control of the diffraction angle of a single nth order diffracted light beam $L_n$.

Still further, the groove G may be caused to wobble by superposing the period T of deviation of the light spot $L_s$ while varying an amount of deviation l of the spot $L_s$ in accordance with the wobble signal $f_v$.

Although the present invention has been described in detail with reference to the presently preferred embodiment, in which the frequency of the wobble signal $f_v$ has been selected to 40 MHz under such conditions as revolutions per minute (RPM) of the turntable $8a$ mounted with the recording disk R is 1,800 r.p.m. at the point of 60 mm from the axis of the recording disk in radial direction, however the wobble signal $f_v$ may be selected to be such a frequency as having a period T of deviation that causes the light spot $L_s$ to deviate not greater than one half of the diameter of the light spot $L_s$ even at a position of the maximum radius of the recording disk R while the recording disk R is rotated at the maximum rotating speed for recording. In addition to the above, the first order diffracted light beam $L_1$ has been employed in the preferred embodiment as described above as the nth order diffracted light beam $L_n$, however, a second order diffracted light beam $L_2$, a third order diffracted light beam $L_3$, . . . may be employed as the nth order diffracted light beam $L_n$.

Further, while the present invention has been described as being applied to an optical recording apparatus employing an acousto-optic deflector as the optical light beam deflector 2, however, an electro-optic deflector employing the electro-optic effect may be substituted for the acousto-optic deflector.

It should be appreciated form the foregoing description that various changes may be made by those skilled in the art without departing from the scope of the invention. Therefore, it is intended that the invention is not limited to the particular embodiment disclosed as the best mode contemplated for carrying out this invention, but the invention will includes all embodiments falling in the scope of the appended claims.

What is claimed is:

1. An optical recording method comprising the steps of:
    projecting, from a source, a write beam on a recording medium;
    wobbling said projected write beam in a direction perpendicular to a groove to be formed on the recording medium;
    wherein a period of deviation of said wobbled write beam on the recording medium does not exceed one half of the diameter of a write beam spot used for forming a groove having a greater diameter than that of the write beam spot.

2. An optical recording method as defined in claim 1, wherein said write beam has a diameter within a range of 0.3 $\mu$m through 0.8 $\mu$m.

3. An optical recording method as defined in claim 1, wherein said amount of deviation is within a range of 0 μm through 0.6 μm.

4. An optical recording apparatus comprising:
   means for projecting, form a source, a write beam on a recording medium;
   means for wobbling said projected write beam in a direction perpendicular to a groove to be formed on the recording medium;
   wherein a period of deviation of said wobbled write beam on the recording medium does not exceed one half of the diameter of a write beam spot used to form a groove having a greater diameter than that of the write beam spot.

5. An optical recording apparatus as defined in claim 4, wherein said means for wobbling changes an angle of diffraction of said projected write beam.

* * * * *